US009008485B2

(12) United States Patent
Ramirez et al.

(10) Patent No.: US 9,008,485 B2
(45) Date of Patent: Apr. 14, 2015

(54) ATTACHMENT MECHANISMS EMPLOYED TO ATTACH A REAR HOUSING SECTION TO A FIBER OPTIC HOUSING, AND RELATED ASSEMBLIES AND METHODS

(75) Inventors: Erika Guadalupe Chapa Ramirez, Reynosa (MX); Juan Miguel Gonzalez Covarrubias, Reynosa (MX); Andrew Philip Cowen, Keller, TX (US); Arturo Parra Morales, Reynosa (MX); Brian Keith Rhoney, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 290 days.

(21) Appl. No.: 13/455,646

(22) Filed: Apr. 25, 2012

(65) Prior Publication Data

US 2012/0288248 A1 Nov. 15, 2012

Related U.S. Application Data

(60) Provisional application No. 61/483,918, filed on May 9, 2011.

(51) Int. Cl.
*G02B 6/00* (2006.01)
*H02B 1/01* (2006.01)
*G02B 6/44* (2006.01)

(52) U.S. Cl.
CPC .......... *G02B 6/4452* (2013.01); *G02B 6/4455* (2013.01)

(58) Field of Classification Search
CPC .... H04Q 1/133; G02B 6/4452; G02B 6/4477; G02B 6/3897; G02B 6/3887
USPC ........... 385/134–136; 361/825, 826; 174/135
See application file for complete search history.

(56) References Cited

U.S. PATENT DOCUMENTS 620,013 A 2/1899 Barnes
2,528,910 A 11/1950 Poe
(Continued)

FOREIGN PATENT DOCUMENTS

AU 2010270959 A1 2/2012
CA 2029592 A1 5/1992
(Continued)

OTHER PUBLICATIONS

International Search Report for PCT/US2012/023622 mailed Mar. 9, 2012, 4 pages.
(Continued)

*Primary Examiner* — Ryan Lepisto
*Assistant Examiner* — Robert Tavlykaev

(57) ABSTRACT

Attachment mechanisms configured to be employed to attach a rear housing section to a fiber optic housing, and related assemblies and methods are disclosed. The rear housing section and the fiber optic housing may be part of fiber optic equipment configured to support fiber optic connections of a fiber optic network. The attachment mechanism is configured to be attached and extend from the rear housing section of the fiber optic housing while maintaining the same installed U space of the housing. The attachment mechanism may include a spring plunger which may releasably maintain the rear housing section in a position to allow fasteners to removably attach the rear housing section to the fiber optic housing. In this manner, the rear housing section may be attached to and removed from the fiber optic housing in an efficient manner to minimize downtime for the fiber optic network.

20 Claims, 5 Drawing Sheets

(56) References Cited

U.S. PATENT DOCUMENTS

| | | | |
|---|---|---|---|
| 2,614,685 A | 10/1952 | Miller | |
| 3,081,717 A | 3/1963 | Yurevich | |
| 3,175,873 A | 3/1965 | Blomquist et al. | |
| 3,212,192 A | 10/1965 | Bachmann et al. | |
| 3,433,886 A | 3/1969 | Myers | |
| 3,494,306 A | 2/1970 | Aguilar | |
| 3,545,712 A | 12/1970 | Ellis | |
| 3,568,263 A | 3/1971 | Meehan | |
| 3,646,244 A | 2/1972 | Cole | |
| 3,664,514 A | 5/1972 | Drake | |
| 3,683,238 A | 8/1972 | Olds et al. | |
| 3,701,835 A | 10/1972 | Eisele et al. | |
| 3,880,396 A | 4/1975 | Freiberger et al. | |
| 3,906,592 A | 9/1975 | Sakasegawa et al. | |
| 3,991,960 A | 11/1976 | Tanaka | |
| 4,047,797 A | 9/1977 | Arnold et al. | |
| 4,059,872 A | 11/1977 | Delesandri | |
| 4,119,285 A | 10/1978 | Bisping et al. | |
| 4,148,454 A | 4/1979 | Carlson et al. | |
| 4,239,316 A | 12/1980 | Spaulding | |
| 4,244,638 A * | 1/1981 | Little et al. | 439/471 |
| 4,285,486 A | 8/1981 | Von Osten et al. | |
| 4,303,296 A | 12/1981 | Spaulding | |
| 4,354,731 A | 10/1982 | Mouissie | |
| 4,457,482 A | 7/1984 | Kitagawa | |
| 4,525,012 A | 6/1985 | Dunner | |
| 4,540,222 A | 9/1985 | Burrell | |
| 4,561,615 A | 12/1985 | Medlin, Jr. | |
| 4,564,163 A | 1/1986 | Barnett | |
| 4,597,173 A | 7/1986 | Chino et al. | |
| 4,611,875 A | 9/1986 | Clarke et al. | |
| 4,635,886 A | 1/1987 | Santucci et al. | |
| 4,645,292 A | 2/1987 | Sammueller | |
| 4,657,340 A | 4/1987 | Tanaka et al. | |
| 4,681,288 A | 7/1987 | Nakamura | |
| 4,702,551 A | 10/1987 | Coulombe | |
| 4,711,518 A | 12/1987 | Shank et al. | |
| 4,736,100 A | 4/1988 | Vastagh | |
| 4,744,629 A | 5/1988 | Bertoglio et al. | |
| 4,747,020 A | 5/1988 | Brickley et al. | |
| 4,752,110 A | 6/1988 | Blanchet et al. | |
| 4,753,510 A | 6/1988 | Sezerman | |
| 4,787,706 A | 11/1988 | Cannon, Jr. et al. | |
| 4,792,203 A | 12/1988 | Nelson et al. | |
| 4,798,432 A | 1/1989 | Becker et al. | |
| 4,805,979 A | 2/1989 | Bossard et al. | |
| 4,808,774 A | 2/1989 | Crane | |
| 4,824,193 A | 4/1989 | Maeda et al. | |
| 4,824,196 A | 4/1989 | Bylander | |
| 4,826,277 A | 5/1989 | Weber et al. | |
| 4,838,643 A | 6/1989 | Hodges et al. | |
| 4,840,449 A | 6/1989 | Ghandeharizadeh | |
| 4,865,280 A | 9/1989 | Wollar | |
| 4,898,448 A | 2/1990 | Cooper | |
| 4,900,123 A | 2/1990 | Barlow et al. | |
| 4,911,662 A | 3/1990 | Debortoli et al. | |
| 4,948,220 A | 8/1990 | Violo et al. | |
| 4,949,376 A | 8/1990 | Nieves et al. | |
| 4,971,421 A | 11/1990 | Ori | |
| 4,986,625 A | 1/1991 | Yamada et al. | |
| 4,988,831 A * | 1/1991 | Wilson et al. | 174/662 |
| 4,991,928 A | 2/1991 | Zimmer | |
| 4,995,688 A | 2/1991 | Anton et al. | |
| 5,001,602 A | 3/1991 | Suffi et al. | |
| 5,005,941 A | 4/1991 | Barlow et al. | |
| 5,017,211 A | 5/1991 | Wenger et al. | |
| 5,023,646 A | 6/1991 | Ishida et al. | |
| 5,024,498 A | 6/1991 | Becker et al. | |
| 5,028,114 A | 7/1991 | Krausse et al. | |
| 5,037,175 A | 8/1991 | Weber | |
| 5,048,918 A | 9/1991 | Daems et al. | |
| 5,060,897 A | 10/1991 | Thalenfeld | |
| 5,066,149 A | 11/1991 | Wheeler et al. | |
| 5,067,784 A | 11/1991 | Debortoli et al. | |
| 5,071,211 A | 12/1991 | Debortoli et al. | |
| 5,071,220 A | 12/1991 | Ruello et al. | |
| 5,073,042 A | 12/1991 | Mulholland et al. | |
| 5,074,635 A | 12/1991 | Justice et al. | |
| 5,076,688 A | 12/1991 | Bowen et al. | |
| 5,080,459 A | 1/1992 | Wettengel et al. | |
| 5,100,221 A | 3/1992 | Carney et al. | |
| 5,104,336 A | 4/1992 | Hatanaka et al. | |
| 5,125,060 A | 6/1992 | Edmundson | |
| 5,127,082 A | 6/1992 | Below et al. | |
| 5,127,851 A | 7/1992 | Hilbert et al. | |
| 5,129,030 A | 7/1992 | Petrunia | |
| 5,129,607 A | 7/1992 | Satoh | |
| 5,133,039 A | 7/1992 | Dixit | |
| 5,138,678 A | 8/1992 | Briggs et al. | |
| 5,138,688 A | 8/1992 | Debortoli | |
| 5,142,598 A | 8/1992 | Tabone | |
| 5,142,607 A | 8/1992 | Petrotta et al. | |
| 5,150,277 A | 9/1992 | Bainbridge et al. | |
| D330,368 S | 10/1992 | Bourgeois et al. | |
| 5,152,760 A | 10/1992 | Latina | |
| 5,153,910 A | 10/1992 | Mickelson et al. | |
| 5,157,749 A | 10/1992 | Briggs et al. | |
| 5,167,001 A | 11/1992 | Debortoli et al. | |
| 5,170,452 A | 12/1992 | Ott | |
| 5,189,723 A | 2/1993 | Johnson et al. | |
| 5,199,099 A | 3/1993 | Dalgoutte | |
| 5,204,929 A | 4/1993 | Machall et al. | |
| 5,209,572 A | 5/1993 | Jordan | |
| 5,214,735 A | 5/1993 | Henneberger et al. | |
| 5,224,186 A | 6/1993 | Kishimoto et al. | |
| 5,230,492 A | 7/1993 | Zwart et al. | |
| 5,231,687 A | 7/1993 | Handley | |
| 5,231,688 A | 7/1993 | Zimmer | |
| 5,233,674 A | 8/1993 | Vladic | |
| 5,239,609 A | 8/1993 | Auteri | |
| 5,243,679 A | 9/1993 | Sharrow et al. | |
| 5,253,320 A | 10/1993 | Takahashi et al. | |
| 5,260,957 A | 11/1993 | Hakimi et al. | |
| 5,261,633 A | 11/1993 | Mastro | |
| 5,265,187 A | 11/1993 | Morin et al. | |
| 5,274,729 A | 12/1993 | King et al. | |
| 5,274,731 A | 12/1993 | White | |
| 5,278,933 A | 1/1994 | Hunsinger et al. | |
| 5,280,138 A | 1/1994 | Preston et al. | |
| 5,285,515 A | 2/1994 | Milanowski et al. | |
| 5,291,570 A | 3/1994 | Filgas et al. | |
| 5,315,679 A | 5/1994 | Baldwin et al. | |
| 5,317,663 A | 5/1994 | Beard et al. | |
| 5,323,478 A | 6/1994 | Milanowski et al. | |
| 5,323,480 A | 6/1994 | Mullaney et al. | |
| 5,329,520 A | 7/1994 | Richardson | |
| 5,333,193 A | 7/1994 | Cote et al. | |
| 5,333,221 A | 7/1994 | Briggs et al. | |
| 5,333,222 A | 7/1994 | Belenkiy et al. | |
| 5,337,400 A | 8/1994 | Morin et al. | |
| 5,339,379 A | 8/1994 | Kutsch et al. | |
| 5,347,603 A | 9/1994 | Belenkiy et al. | |
| 5,353,367 A | 10/1994 | Czosnowski et al. | |
| 5,359,688 A | 10/1994 | Underwood | |
| 5,363,466 A | 11/1994 | Milanowski et al. | |
| 5,363,467 A | 11/1994 | Keith | |
| 5,366,388 A | 11/1994 | Freeman et al. | |
| 5,367,598 A | 11/1994 | Devenish, III et al. | |
| 5,373,421 A | 12/1994 | Detsikas et al. | |
| 5,383,051 A | 1/1995 | Delrosso et al. | |
| 5,390,272 A | 2/1995 | Repta et al. | |
| 5,398,295 A | 3/1995 | Chang et al. | |
| 5,398,820 A | 3/1995 | Kiss | |
| 5,399,814 A | 3/1995 | Staber et al. | |
| 5,401,193 A | 3/1995 | Lo Cicero et al. | |
| 5,402,515 A | 3/1995 | Vidacovich et al. | |
| 5,408,557 A | 4/1995 | Hsu | |
| RE34,955 E | 5/1995 | Anton et al. | |
| 5,412,751 A | 5/1995 | Siemon et al. | |
| 5,416,837 A | 5/1995 | Cote et al. | |
| 5,418,874 A | 5/1995 | Carlisle et al. | |
| 5,420,956 A | 5/1995 | Grugel et al. | |
| 5,420,958 A | 5/1995 | Henson et al. | |
| 5,421,532 A | 6/1995 | Richter | |

(56) References Cited

U.S. PATENT DOCUMENTS

| | | |
|---|---|---|
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,495,549 A | 2/1996 | Schneider et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A | 7/1996 | Gobbi |
| 5,538,213 A | 7/1996 | Brown |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,563,971 A | 10/1996 | Abendschein |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,910 A | 9/1997 | Arnett |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,692,079 A | 11/1997 | Iso |
| 5,694,511 A | 12/1997 | Pimpinella et al. |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,806,687 A | 9/1998 | Ballesteros et al. |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,987,203 A | 11/1999 | Abel et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,027,352 A | 2/2000 | Byrne |
| 6,041,042 A | 3/2000 | Bussiere |
| 6,044,193 A | 3/2000 | Szentesi et al. |
| 6,049,963 A | 4/2000 | Boe |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,088,497 A | 7/2000 | Phillips et al. |
| 6,118,075 A | 9/2000 | Baker et al. |
| 6,127,627 A | 10/2000 | Daoud |
| 6,130,983 A | 10/2000 | Cheng |
| 6,134,370 A | 10/2000 | Childers et al. |
| 6,141,222 A | 10/2000 | Toor et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,170,784 B1 | 1/2001 | MacDonald et al. |
| 6,172,782 B1 | 1/2001 | Kobayashi |
| 6,175,079 B1 | 1/2001 | Johnston et al. |
| 6,181,861 B1 | 1/2001 | Wenski et al. |
| 6,188,687 B1 | 2/2001 | Mussman et al. |

(56) References Cited

U.S. PATENT DOCUMENTS

| | | | |
|---|---|---|---|
| 6,188,825 B1 | 2/2001 | Bandy et al. | |
| 6,192,180 B1 | 2/2001 | Kim et al. | |
| 6,200,170 B1 | 3/2001 | Amberg et al. | |
| 6,201,919 B1 | 3/2001 | Puetz et al. | |
| 6,201,920 B1 | 3/2001 | Noble et al. | |
| 6,208,796 B1 | 3/2001 | Williams | |
| 6,212,324 B1 | 4/2001 | Lin et al. | |
| 6,215,938 B1 | 4/2001 | Reitmeier et al. | |
| 6,216,987 B1 | 4/2001 | Fukuo | |
| 6,227,717 B1 | 5/2001 | Ott et al. | |
| 6,229,948 B1 | 5/2001 | Blee et al. | |
| 6,234,683 B1 | 5/2001 | Waldron et al. | |
| 6,234,685 B1 | 5/2001 | Carlisle et al. | |
| 6,236,795 B1 | 5/2001 | Rodgers | |
| 6,240,229 B1 | 5/2001 | Roth | |
| 6,243,522 B1 | 6/2001 | Allan et al. | |
| 6,245,998 B1 | 6/2001 | Curry et al. | |
| 6,247,851 B1 | 6/2001 | Ichihara | |
| 6,250,816 B1 | 6/2001 | Johnston et al. | |
| 6,259,850 B1 | 7/2001 | Crosby, Jr. et al. | |
| 6,263,141 B1 | 7/2001 | Smith | |
| 6,265,680 B1 | 7/2001 | Robertson | |
| 6,269,212 B1 | 7/2001 | Schiattone | |
| 6,273,532 B1 | 8/2001 | Chen et al. | |
| 6,275,641 B1 | 8/2001 | Daoud | |
| 6,278,829 B1 | 8/2001 | BuAbbud et al. | |
| 6,278,831 B1 | 8/2001 | Henderson et al. | |
| D448,005 S | 9/2001 | Klein, Jr. et al. | |
| 6,289,618 B1 | 9/2001 | Kump et al. | |
| 6,292,614 B1 | 9/2001 | Smith et al. | |
| 6,301,424 B1 | 10/2001 | Hwang | |
| 6,305,848 B1 | 10/2001 | Gregory | |
| 6,307,997 B1 | 10/2001 | Walters et al. | |
| 6,318,824 B1 | 11/2001 | LaGrotta et al. | |
| 6,321,017 B1 | 11/2001 | Janus et al. | |
| 6,322,279 B1 | 11/2001 | Yamamoto et al. | |
| 6,324,575 B1 | 11/2001 | Jain et al. | |
| 6,325,549 B1 | 12/2001 | Shevchuk | |
| 6,327,059 B1 | 12/2001 | Bhalla et al. | |
| RE37,489 E | 1/2002 | Anton et al. | |
| 6,343,313 B1 | 1/2002 | Salesky et al. | |
| 6,344,615 B1 | 2/2002 | Nolf et al. | |
| 6,347,888 B1 | 2/2002 | Puetz | |
| 6,353,696 B1 | 3/2002 | Gordon et al. | |
| 6,353,697 B1 | 3/2002 | Daoud | |
| 6,357,712 B1 | 3/2002 | Lu | |
| 6,359,228 B1 | 3/2002 | Strause et al. | |
| 6,363,198 B1 | 3/2002 | Braga et al. | |
| 6,363,200 B1 | 3/2002 | Thompson et al. | |
| 6,370,309 B1 | 4/2002 | Daoud | |
| 6,371,419 B1 | 4/2002 | Ohnuki | |
| 6,375,129 B2 | 4/2002 | Koziol | |
| 6,377,218 B1 | 4/2002 | Nelson et al. | |
| 6,379,052 B1 | 4/2002 | De Jong et al. | |
| 6,381,642 B1 | 4/2002 | O'Donnell et al. | |
| 6,385,374 B2 | 5/2002 | Kropp | |
| 6,385,381 B1 | 5/2002 | Janus et al. | |
| 6,389,214 B1 | 5/2002 | Smith et al. | |
| 6,397,166 B1 | 5/2002 | Leung et al. | |
| 6,398,149 B1 | 6/2002 | Hines et al. | |
| 6,406,314 B1 | 6/2002 | Byrne | |
| 6,410,850 B1 | 6/2002 | Abel et al. | |
| 6,411,767 B1 | 6/2002 | Burrous et al. | |
| 6,412,986 B1 | 7/2002 | Ngo et al. | |
| 6,418,262 B1 | 7/2002 | Puetz et al. | |
| 6,419,519 B1 | 7/2002 | Young | |
| 6,424,781 B1 | 7/2002 | Puetz et al. | |
| 6,425,694 B1 | 7/2002 | Szilagyi et al. | |
| 6,427,045 B1 | 7/2002 | Matthes et al. | |
| 6,431,762 B1 | 8/2002 | Taira et al. | |
| 6,434,313 B1 | 8/2002 | Clapp, Jr. et al. | |
| 6,438,310 B1 | 8/2002 | Lance et al. | |
| 6,452,925 B1 | 9/2002 | Sistanizadeh et al. | |
| 6,456,773 B1 | 9/2002 | Keys | |
| 6,464,402 B1 | 10/2002 | Andrews et al. | |
| 6,466,724 B1 | 10/2002 | Glover et al. | |
| 6,469,905 B1 | 10/2002 | Hwang | |
| D466,087 S | 11/2002 | Cuny et al. | |
| 6,478,472 B1 | 11/2002 | Anderson et al. | |
| 6,480,487 B1 | 11/2002 | Wegleitner et al. | |
| 6,480,660 B1 | 11/2002 | Reitmeier et al. | |
| 6,483,977 B2 | 11/2002 | Battey et al. | |
| 6,484,958 B1 | 11/2002 | Xue et al. | |
| 6,494,550 B1 | 12/2002 | Chen et al. | |
| 6,496,640 B1 | 12/2002 | Harvey et al. | |
| 6,504,988 B1 | 1/2003 | Trebesch et al. | |
| 6,507,980 B2 | 1/2003 | Bremicker | |
| 6,510,274 B1 | 1/2003 | Wu et al. | |
| 6,532,332 B2 | 3/2003 | Solheid et al. | |
| 6,533,472 B1 | 3/2003 | Dinh et al. | |
| 6,535,397 B2 | 3/2003 | Clark et al. | |
| 6,539,147 B1 | 3/2003 | Mahony | |
| 6,539,160 B2 | 3/2003 | Battey et al. | |
| 6,542,688 B1 | 4/2003 | Battey et al. | |
| 6,544,075 B1 | 4/2003 | Liao | |
| 6,550,977 B2 | 4/2003 | Hizuka | |
| 6,554,485 B1 | 4/2003 | Beatty et al. | |
| 6,560,334 B1 | 5/2003 | Mullaney et al. | |
| 6,567,601 B2 | 5/2003 | Daoud et al. | |
| 6,568,542 B1 * | 5/2003 | Chen ............................ 211/26 |
| 6,571,048 B1 | 5/2003 | Bechamps et al. | |
| 6,577,595 B1 | 6/2003 | Counterman | |
| 6,577,801 B2 | 6/2003 | Broderick et al. | |
| 6,579,014 B2 | 6/2003 | Melton et al. | |
| 6,584,267 B1 | 6/2003 | Caveney et al. | |
| 6,585,423 B1 | 7/2003 | Vergeest | |
| 6,587,630 B2 | 7/2003 | Spence et al. | |
| 6,588,938 B1 | 7/2003 | Lampert et al. | |
| 6,591,051 B2 | 7/2003 | Solheid et al. | |
| 6,591,053 B2 | 7/2003 | Fritz | |
| 6,592,266 B1 | 7/2003 | Hankins et al. | |
| 6,597,670 B1 | 7/2003 | Tweedy et al. | |
| 6,600,106 B2 * | 7/2003 | Standish et al. ............. 174/68.3 |
| 6,600,866 B2 | 7/2003 | Gatica et al. | |
| 6,601,997 B2 | 8/2003 | Ngo | |
| 6,612,515 B1 | 9/2003 | Tinucci et al. | |
| 6,612,874 B1 | 9/2003 | Stout et al. | |
| 6,614,978 B1 | 9/2003 | Caveney | |
| 6,614,980 B1 | 9/2003 | Mahony | |
| 6,621,975 B2 | 9/2003 | Laporte et al. | |
| 6,622,873 B2 | 9/2003 | Hegrenes et al. | |
| 6,624,389 B1 | 9/2003 | Cox | |
| 6,625,374 B2 | 9/2003 | Holman et al. | |
| 6,625,375 B1 | 9/2003 | Mahony | |
| 6,631,237 B2 | 10/2003 | Knudsen et al. | |
| 6,640,042 B2 | 10/2003 | Araki et al. | |
| RE38,311 E | 11/2003 | Wheeler | |
| 6,644,863 B1 | 11/2003 | Azami et al. | |
| 6,647,197 B1 | 11/2003 | Marrs et al. | |
| 6,648,520 B2 | 11/2003 | McDonald et al. | |
| 6,654,536 B2 | 11/2003 | Battey et al. | |
| 6,668,127 B1 | 12/2003 | Mahony | |
| 6,669,149 B2 | 12/2003 | Akizuki | |
| 6,677,520 B1 | 1/2004 | Kim et al. | |
| 6,679,604 B1 | 1/2004 | Bove et al. | |
| 6,687,450 B1 | 2/2004 | Kempeneers et al. | |
| 6,693,552 B1 | 2/2004 | Herzig et al. | |
| 6,695,620 B1 | 2/2004 | Huang | |
| 6,701,056 B2 | 3/2004 | Burek et al. | |
| 6,710,366 B1 | 3/2004 | Lee et al. | |
| 6,715,619 B2 | 4/2004 | Kim et al. | |
| 6,719,149 B2 | 4/2004 | Tomino | |
| 6,721,482 B1 | 4/2004 | Glynn | |
| 6,741,784 B1 | 5/2004 | Guan | |
| 6,741,785 B2 | 5/2004 | Barthel et al. | |
| 6,746,037 B1 | 6/2004 | Kaplenski et al. | |
| 6,748,154 B2 | 6/2004 | O'Leary et al. | |
| 6,748,155 B2 | 6/2004 | Kim et al. | |
| 6,758,600 B2 | 7/2004 | Del Grosso et al. | |
| 6,768,860 B2 | 7/2004 | Liberty | |
| 6,771,861 B2 | 8/2004 | Wagner et al. | |
| 6,773,297 B2 | 8/2004 | Komiya | |
| 6,778,525 B1 | 8/2004 | Baum et al. | |
| 6,778,752 B2 | 8/2004 | Laporte et al. | |

(56) References Cited

U.S. PATENT DOCUMENTS

| | | |
|---|---|---|
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 * | 11/2004 | Lin .................. 174/135 |
| 6,819,856 B2 | 11/2004 | Dagley et al. |
| 6,819,857 B2 | 11/2004 | Douglas et al. |
| 6,822,874 B1 | 11/2004 | Marler |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,856,505 B1 | 2/2005 | Venegas et al. |
| 6,863,444 B2 | 3/2005 | Anderson et al. |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke et al. |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke et al. |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,945,701 B2 | 9/2005 | Trezza et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,140,903 B2 | 11/2006 | Pulizzi et al. |
| 7,147,383 B2 | 12/2006 | Sullivan |
| 7,170,466 B2 | 1/2007 | Janoschka |
| 7,171,099 B2 | 1/2007 | Barnes et al. |
| 7,171,121 B1 | 1/2007 | Skarica et al. |
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,217,040 B2 | 5/2007 | Crews et al. |
| 7,218,526 B2 | 5/2007 | Mayer |
| 7,220,065 B2 | 5/2007 | Han et al. |
| 7,221,832 B2 | 5/2007 | Tinucci |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,352,946 B2 | 4/2008 | Heller et al. |
| 7,352,947 B2 * | 4/2008 | Phung et al. .................. 385/135 |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |

(56) References Cited

U.S. PATENT DOCUMENTS

| | | | |
|---|---|---|---|
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,435,090 B1 | 10/2008 | Schriefer et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 * | 3/2009 | Fransen et al. ............ 439/449 |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,540,666 B2 | 6/2009 | Luther et al. |
| 7,542,645 B1 | 6/2009 | Hua et al. |
| 7,544,085 B2 | 6/2009 | Baldwin et al. |
| 7,552,899 B2 | 6/2009 | Chen et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,614,903 B1 | 11/2009 | Huang |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,689,079 B2 | 3/2010 | Burnham et al. |
| 7,694,926 B2 | 4/2010 | Allen et al. |
| 7,697,811 B2 | 4/2010 | Murano et al. |
| 7,706,294 B2 | 4/2010 | Natarajan et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,751,674 B2 | 7/2010 | Hill |
| 7,751,675 B2 | 7/2010 | Holmberg et al. |
| 7,756,371 B1 | 7/2010 | Burnham et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,232 B2 | 10/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,837,495 B2 | 11/2010 | Baldwin et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,876,580 B2 * | 1/2011 | Mayer ............ 361/826 |
| 7,899,298 B2 | 3/2011 | Cox et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 7,991,252 B2 | 8/2011 | Cheng et al. |
| 8,009,959 B2 | 8/2011 | Barnes et al. |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,093,499 B2 * | 1/2012 | Hoffer et al. ............ 174/72 A |
| 8,107,785 B2 | 1/2012 | Berglund et al. |
| 8,131,126 B2 | 3/2012 | Kowalczyk et al. |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,220,881 B2 | 7/2012 | Keith |
| 8,226,305 B2 | 7/2012 | Thirugnanam et al. |
| 8,249,410 B2 | 8/2012 | Andrus et al. |
| 8,251,591 B2 | 8/2012 | Barnes et al. |
| 8,270,798 B2 | 9/2012 | Dagley et al. |
| 8,280,216 B2 | 10/2012 | Cooke et al. |
| 8,285,104 B2 | 10/2012 | Davis et al. |
| 8,301,004 B2 | 10/2012 | Cooke et al. |
| 8,331,752 B2 | 12/2012 | Biribuze et al. |
| 8,353,494 B2 | 1/2013 | Peng et al. |
| 8,369,679 B2 | 2/2013 | Wakileh et al. |
| 8,391,666 B2 | 3/2013 | Hetzer et al. |
| 8,472,773 B2 | 6/2013 | de Jong |
| 8,491,331 B2 | 7/2013 | Follingstad |
| 8,528,872 B2 | 9/2013 | Mattlin et al. |
| 8,537,477 B2 | 9/2013 | Shioda |
| 8,538,226 B2 * | 9/2013 | Makrides-Saravanos et al. ............ 385/135 |
| 8,559,783 B2 | 10/2013 | Campos et al. |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0014571 A1 | 2/2002 | Thompson |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0007743 A1 | 1/2003 | Asada |
| 2003/0007767 A1 | 1/2003 | Douglas et al. |
| 2003/0011855 A1 | 1/2003 | Fujiwara |

(56) References Cited

U.S. PATENT DOCUMENTS

| | | |
|---|---|---|
| 2003/0021539 A1 | 1/2003 | Kwon et al. |
| 2003/0036748 A1 | 2/2003 | Cooper et al. |
| 2003/0051026 A1 | 3/2003 | Carter et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0156552 A1 | 8/2003 | Banker et al. |
| 2003/0174996 A1 | 9/2003 | Henschel et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0178573 A1 | 8/2005 | James |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0285493 A1 | 12/2005 | Hu et al. |
| 2006/0007562 A1 | 1/2006 | Willey et al. |
| 2006/0018448 A1 | 1/2006 | Stevens et al. |
| 2006/0018622 A1* | 1/2006 | Caveney et al. .............. 385/135 |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0103270 A1 | 5/2006 | Bergesch et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1* | 10/2006 | Clark et al. .................. 174/135 |
| 2006/0228087 A1 | 10/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0058641 A1 | 3/2007 | Cicchetti et al. |
| 2007/0086723 A1 | 4/2007 | Sasaki et al. |
| 2007/0104447 A1 | 5/2007 | Allen |
| 2007/0110373 A1 | 5/2007 | Dudek et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0266192 A1 | 11/2007 | Campini et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175541 A1 | 7/2008 | Lu et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |

(56) References Cited

U.S. PATENT DOCUMENTS

| | | |
|---|---|---|
| 2009/0016685 A1 | 1/2009 | Hudgins et al. |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0110347 A1 | 4/2009 | Jacobsson |
| 2009/0121092 A1 | 5/2009 | Keith |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0290843 A1 | 11/2009 | Reagan et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054681 A1 | 3/2010 | Biribuze et al. |
| 2010/0054682 A1 | 3/2010 | Cooke et al. |
| 2010/0054683 A1 | 3/2010 | Cooke et al. |
| 2010/0054684 A1* | 3/2010 | Cooke et al. .................. 385/135 |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0249950 A1 | 10/2011 | Ramirez et al. |
| 2011/0268404 A1 | 11/2011 | Cote et al. |
| 2011/0268405 A1 | 11/2011 | Cote et al. |
| 2011/0268407 A1 | 11/2011 | Cowen et al. |
| 2011/0268408 A1 | 11/2011 | Giraud et al. |
| 2011/0268413 A1 | 11/2011 | Cote et al. |
| 2011/0280537 A1 | 11/2011 | Cowen et al. |
| 2012/0025683 A1 | 2/2012 | Mattlin et al. |
| 2012/0051707 A1 | 3/2012 | Barnes et al. |
| 2012/0057838 A1 | 3/2012 | Hill et al. |
| 2012/0106899 A1 | 5/2012 | Choi |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Ramirez et al. |
| 2012/0301083 A1 | 11/2012 | Carter et al. |
| 2013/0004136 A1 | 1/2013 | Brower et al. |
| 2013/0058616 A1 | 3/2013 | Cote et al. |
| 2013/0077927 A1 | 3/2013 | O'Connor |
| 2013/0214108 A1 | 8/2013 | Irudayaraj et al. |
| 2013/0266282 A1 | 10/2013 | Cote et al. |
| 2013/0308916 A1 | 11/2013 | Buff et al. |
| 2014/0003782 A1 | 1/2014 | Blackwell, Jr. et al. |
| 2014/0010510 A1 | 1/2014 | Blackard |
| 2014/0112628 A1 | 4/2014 | Keenum et al. |

FOREIGN PATENT DOCUMENTS

| | | |
|---|---|---|
| CA | 2186314 A1 | 4/1997 |
| CA | 2765835 A1 | 1/2011 |
| CH | 688705 A5 | 1/1998 |
| CN | 102460258 A | 5/2012 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |

(56) References Cited

FOREIGN PATENT DOCUMENTS

| | | |
|---|---|---|
| DE | 202007000556 U1 | 10/2007 |
| DE | 102007024476 A1 | 11/2008 |
| DE | 202010009385 U1 | 9/2010 |
| EP | 29512 A1 | 6/1981 |
| EP | 0105597 A2 | 4/1984 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0776557 B1 | 6/1997 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1162485 A2 | 12/2001 |
| EP | 1203974 A2 | 5/2002 |
| EP | 1289319 A2 | 3/2003 |
| EP | 1310816 A2 | 5/2003 |
| EP | 1316829 A2 | 6/2003 |
| EP | 1367308 A1 | 12/2003 |
| EP | 1621907 A1 | 2/2006 |
| EP | 1777563 A1 | 4/2007 |
| EP | 2060942 A2 | 5/2009 |
| EP | 2159613 A2 | 3/2010 |
| FR | 1586331 A | 2/1970 |
| FR | 2123728 A5 | 9/1972 |
| FR | 2378378 A1 | 8/1978 |
| GB | 2241591 A | 9/1991 |
| GB | 2277812 A | 11/1994 |
| GB | 2367379 A | 4/2002 |
| GB | 2377839 A | 1/2003 |
| JP | 3060994 A | 3/1991 |
| JP | 3172806 A | 7/1991 |
| JP | 3281378 A | 12/1991 |
| JP | 5045541 A | 2/1993 |
| JP | 06018749 A | 1/1994 |
| JP | 7308011 A | 11/1995 |
| JP | 7318761 A | 12/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002077236 A | 3/2002 |
| JP | 2002116337 A | 4/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 2005257937 A | 9/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 2006292924 A | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008271017 A | 11/2008 |
| JP | 2008542822 T | 11/2008 |
| JP | 2009503582 T | 1/2009 |
| JP | 2009229506 A | 10/2009 |
| JP | 2012065019 A | 3/2012 |
| KR | 20110037404 A | 4/2011 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9638752 A1 | 12/1996 |
| WO | 9712268 A1 | 4/1997 |
| WO | 9722025 A1 | 6/1997 |
| WO | 9736197 A1 | 10/1997 |
| WO | 9744605 A1 | 11/1997 |
| WO | 9825416 A1 | 6/1998 |
| WO | 9927404 A1 | 6/1999 |
| WO | 0005611 A2 | 2/2000 |
| WO | 0127660 A2 | 4/2001 |
| WO | 0130007 A2 | 4/2001 |
| WO | 0180596 A1 | 10/2001 |
| WO | 0242818 A1 | 5/2002 |
| WO | 03009527 A2 | 1/2003 |
| WO | 03014943 A1 | 2/2003 |
| WO | 2004052066 A1 | 6/2004 |
| WO | 2005020400 A1 | 3/2005 |
| WO | 2006076062 A | 7/2006 |
| WO | 2006108024 A1 | 10/2006 |
| WO | 2007050515 A1 | 5/2007 |
| WO | 2007079074 A2 | 7/2007 |
| WO | 2007089682 A2 | 8/2007 |

(56) References Cited

FOREIGN PATENT DOCUMENTS

| WO | 2007149215 A2 | 12/2007 | | |
|---|---|---|---|---|
| WO | 2008027201 A2 | 3/2008 | | |
| WO | WO 2008/027201 A2 | 3/2008 | ............... | G02B 6/44 |
| WO | 2008063054 A2 | 5/2008 | | |
| WO | 2008113054 A2 | 9/2008 | | |
| WO | 2008157248 A1 | 12/2008 | | |
| WO | 2009026688 A1 | 3/2009 | | |
| WO | 2009029485 A1 | 3/2009 | | |
| WO | 2009030360 A1 | 3/2009 | | |
| WO | 2009120280 A2 | 10/2009 | | |
| WO | 2010024847 A2 | 3/2010 | | |
| WO | WO 2010/024847 A2 | 3/2010 | ............... | G02B 6/44 |
| WO | 2010080745 A1 | 7/2010 | | |
| WO | 2011005461 A1 | 1/2011 | | |

OTHER PUBLICATIONS

International Search Report for PCT/US2012/023635 mailed Sep. 14, 2012, 3 pages.
International Search Report for PCT/US2012/023626 mailed May 22, 2012, 4 pages.
Notice of Allowance for U.S. Appl. No. 13/951,916 mailed Dec. 16, 2013, 12 pages.
International Preliminary Report on Patentability for PCT/US2012/052958 mailed Mar. 13, 2014, 14 pages.
Non-final Office Action for U.S. Appl. No. 12/947,883 mailed Sep. 6, 2013, 9 pages.
Final Office Action for U.S. Appl. No. 12/947,883 mailed Mar. 31, 2014, 13 pages.
International Search Report for PCT/US2011/030446 mailed Jul. 14, 2011, 2 pages.
International Search Report for PCT/US2011/030448 mailed Jul. 20, 2011, 2 pages.
International Search Report for PCT/US2011/030466 mailed Aug. 5, 2011, 2 pages.
International Search Report for PCT/US2012/052958 mailed Mar. 1, 2013, 7 pages.
International Search Report for PCT/US2013/041266 mailed Aug. 20, 2013, 4 pages.
Non-final Office Action for U.S. Appl. No. 13/621,958 mailed Feb. 13, 2014, 10 pages.
Non-final Office Action for U.S. Appl. No. 13/649,417 mailed Feb. 13, 2014, 10 pages.
Non-final Office Action for U.S. Appl. No. 13/663,949 mailed Feb. 3, 2014, 19 pages.
Non-final Office Action for U.S. Appl. No. 12/953,003 mailed Apr. 14, 2014, 13 pages.
Non-final Office Action for U.S. Appl. No. 12/953,039 mailed Apr. 15, 2014, 8 pages.
Final Office Action for U.S. Appl. No. 12/946,139 mailed Apr. 22, 2014, 18 pages.
Final Office Action for U.S. Appl. No. 13/597,549 mailed Apr. 24, 2014, 10 pages.
Final Office Action for U.S. Appl. No. 13/901,074 mailed May 9, 2014, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.

(56) References Cited

OTHER PUBLICATIONS

International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Non-final Office Action for U.S. Appl. No. 13/901,074 mailed Oct. 9, 2013, 6 pages.
Advisory Action for U.S. Appl. No. 12/953,134 mailed Nov. 4, 2013, 3 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
International Search Report and Written Opinion for PCT/US2011/035683 mailed Sep. 8, 2011, 15 pages.
International Search Report and Written Opinion for PCT/US2010/039218 mailed Oct. 27, 2010, 13 pages.
First Office Action for Chinese patent application 201080032453.2 issued Mar. 26, 2013, 6 pages.
Chinese Search Report for Chinese patent application 201080032453.2 mailed May 15, 2013, 2 pages.
First Office Action for Chinese patent application 201080031621.6 mailed Sep. 26, 2013, 9 pages.
Chinese Search Report for Chinese patent application 201080031621.6 mailed Sep. 13, 2013, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
International Search Report and Written Opinion for PCT/US2011/035684 mailed Jul. 1, 2011, 11 pages.
International Search Report and Written Opinion for PCT/US11/61754 mailed Mar. 26, 2012, 9 pages.
Author Unknown, "144 Fiber Patch Panel 1U," Technical Data, ADTEK Group Limited, 2009, 2 pages.
Advisory Action for U.S. Appl. No. 12/394,114 mailed Jan. 2, 2014, 3 pages.
Notice of Allowance for U.S. Appl. No. 12/871,052 mailed Dec. 24, 2013, 9 pages.
Final Office Action for U.S. Appl. No. 12/953,039 mailed Dec. 27, 2013, 10 pages.
Advisory Action for U.S. Appl. No. 12/952,960 mailed Jan. 8, 2014, 3 pages.
Advisory Action for U.S. Appl. No. 12/952,912 mailed Nov. 26, 2013, 3 pages.
Examiner's Answer to the Appeal Brief for U.S. Appl. No. 12/953,118 mailed Dec. 3, 2013, 6 pages.
Non-final Office Action for U.S. Appl. No. 13/597,549 mailed Jan. 14, 2014, 9 pages.
Final Office Action for U.S. Appl. No. 12/732,487 mailed Dec. 6, 2013, 24 pages.
Final Office Action for U.S. Appl. No. 12/956,446 mailed Dec. 23, 2013, 12 pages.
Non-final Office Action for U.S. Appl. No. 12/953,536 mailed Dec. 17, 2013, 21 pages.
Non-final Office Action for U.S. Appl. No. 12/819,065 mailed Dec. 3, 2013, 8 pages.
International Search Report and Written Opinion for PCT/US2011/062353 mailed Apr. 10, 2012, 15 pages.
International Search Report for PCT/US2013/041268 mailed Aug. 20, 2013, 5 pages.
Notice of Allowance for U.S. Appl. No. 13/292,130 mailed Feb. 14, 2014, 7 pages.
Final Office Action for U.S. Appl. No. 12/707,889 mailed Feb. 11, 2014, 17 pages.
Non-final Office Action for U.S. Appl. No. 12/940,699 mailed Feb. 3, 2014, 10 pages.
Notice of Allowance for U.S. Appl. No. 12/952,960 mailed Feb. 13, 2014, 7 pages.
Notice of Allowance and Applicant-Initiated Interview Summary for U.S. Appl. No. 12/771,473 mailed Feb. 27, 2014, 8 pages.

(56) References Cited

OTHER PUBLICATIONS

Non-final Office Action for U.S. Appl. No. 13/081,856 mailed Nov. 26, 2013, 11 pages.
Non-final Office Action for U.S. Appl. No. 13/663,975 mailed Jan. 31, 2014, 18 pages.
Non-final Office Action for U.S. Appl. No. 12/394,114 mailed Mar. 21, 2014, 9 pages.
Final Office Action for U.S. Appl. No. 12/940,585 mailed Mar. 18, 2014, 15 pages.
Non-final Office Action for U.S. Appl. No. 12/953,101 mailed Apr. 3, 2014, 9 pages.
Advisory Action for U.S. Appl. No. 12/953,039 mailed Mar. 6, 2014, 3 pages.
Advisory Action for U.S. Appl. No. 12/956,446 mailed Mar. 20, 2014, 3 pages.
Final Office Action for U.S. Appl. No. 13/603,894 mailed Mar. 20, 2014, 15 pages.
Notice of Allowance for U.S. Appl. No. 12/417,325 mailed Aug. 22, 2012, 7 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Non-final Office Action for U.S. Appl. No. 13/688,675 mailed Jan. 31, 2014, 13 pages.
Non-final Office Action for U.S. Appl. No. 12/946,217 mailed Jul. 26, 2012, 25 pages.
Final Office Action for U.S. Appl. No. 12/946,217 mailed Mar. 18, 2013, 48 pages.
Non-final Office Action for U.S. Appl. No. 12/946,217 mailed Oct. 3, 2013, 47 pages.
Final Office Action for U.S. Appl. No. 12/946,217 mailed Apr. 25, 2014, 40 pages.
Non-final Office Action for U.S. Appl. No. 13/833,876 mailed Apr. 24, 2014, 7 pages.
Notice of Allowance for U.S. Appl. No. 12/953,536 mailed May 20, 2014, 9 pages.
Advisory Action for U.S. Appl. No. 12/707,889 mailed Jun. 11, 2014, 4 pages.
Advisory Action for U.S. Appl. No. 12/940,585 mailed Jun. 17, 2014, 3 pages.
Advisory Action for U.S. Appl. No. 12/947,883 mailed Jun. 19, 2014, 3 pages.
Non-final Office Action for U.S. Appl. No. 12/732,487 mailed Jun. 20, 2014, 24 pages.
Non-final Office Action for U.S. Appl. No. 13/621,958 mailed Jun. 20, 2014, 13 pages.
Final Office Action for U.S. Appl. No. 13/649,417 mailed Jun. 25, 2014, 9 pages.
Non-final Office Action for U.S. Appl. No. 12/952,960 mailed Jun. 26, 2014, 13 pages.
Non-final Office Action for U.S. Appl. No. 13/746,938 mailed Jul. 11, 2014, 9 pages.
Non-final Office Action for U.S. Appl. No. 12/751,895 mailed May 20, 2014, 9 pages.
Notice of Allowance for U.S. Appl. No. 13/533,093 mailed Jul. 8, 2014, 9 pages.
Notice of Allowance for U.S. Appl. No. 13/597,549 mailed Jul. 8, 2014, 8 pages.
Notice of Allowance for U.S. Appl. No. 13/455,646 mailed Jun. 2, 2014, 9 pages.
Non-final Office Action for U.S. Appl. No. 12/819,065 mailed Jul. 18, 2014, 10 pages.
Final Office Action for U.S. Appl. No. 12/818,986 mailed Jul. 18, 2014, 27 pages.
Final Office Action for U.S. Appl. No. 13/081,856 mailed Jul. 2, 2014, 8 pages.
Notice of Allowance for U.S. Appl. No. 12/221,117 mailed Jul. 16, 2014, 7 pages.
Decision on Appeal for U.S. Appl. No. 12/221,117 mailed Jul. 1, 2014, 7 pages.
Final Office Action for U.S. Appl. No. 12/394,114 mailed Oct. 25, 2012, 8 pages.
Non-final Office Action for U.S. Appl. No. 12/915,682 mailed Oct. 24, 2012, 8 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
European Search Report for patent application 10790017.7 mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Non-final Office Action for U.S. Appl. No. 12/946,139 mailed Jul. 26, 2012, 12 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.

(56) References Cited

OTHER PUBLICATIONS

Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-final Office Action for U.S. Appl. No. 12/956,475 mailed Oct. 4, 2012, 7 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
Non-final Office Action for U.S. Appl. No. 13/603,894 mailed Oct. 3, 2013, 9 pages.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.I-com.com/content/Article.aspx?Type=P&ID=438.
"19" Rack Panel with 16 MPO Fiber Optic Couplers—1U high," product page, accessed Oct. 23, 2012, 2 pages, http://www.I-com.com/item.aspx?id=9767#.UlbgG8XXay5.
"Drawing for L-com 1U Panel with 16 MTP couplers," May 15, 2007, 1 page, http://www.I-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
Final Office Action for U.S. Appl. No. 12/953,039 mailed Jul. 25, 2014, 10 pages.

(56) References Cited

OTHER PUBLICATIONS

Advisory Action for U.S. Appl. No. 12/953,039 mailed Oct. 3, 2014, 3 pages.
Notice of Allowance for U.S. Appl. No. 12/953,536 mailed Aug. 28, 2014, 9 pages.
Final Office Action for U.S. Appl. No. 13/901,074 mailed Sep. 5, 2014, 7 pages.
Final Office Action for U.S. Appl. No. 13/663,975 mailed Aug. 14, 2014, 42 pages.
Corrected Notice of Allowance for U.S. Appl. No. 13/533,093 mailed Sep. 2, 2014, 7 pages.
Notice of Allowance for U.S. Appl. No. 13/649,417 mailed Sep. 8, 2014, 7 pages.
Examiner's Answer to the Appeal for U.S. Appl. No. 12/952,912 mailed Sep. 11, 2014, 15 pages.
Advisory Action and Examiner-Initiated Interview Summary for U.S. Appl. No. 13/081,856 mailed Sep. 16, 2014, 4 pages.
Non-Final Office Action for U.S. Appl. No. 13/663,949 mailed Sep. 25, 2014, 21 pages.
Non-Final Office Action for U.S. Appl. No. 13/688,675 mailed Sep. 30, 2014, 9 pages.
Notice of Allowance for U.S. Appl. No. 13/597,549 mailed Oct. 3, 2014, 8 pages.
Decision on Appeal for U.S. Appl. No. 11/320,062 mailed Aug. 14, 2014, 8 pages.
Final Office Action for U.S. Appl. No. 12/953,101 mailed Oct. 20, 2014, 14 pages.
Notice of Allowance for U.S. Appl. No. 13/533,093 mailed Oct. 17, 2014, 9 pages.
Notice of Allowance for U.S. Appl. No. 12/732,487 mailed Oct. 7, 2014, 8 pages.
Non-Final Office Action for U.S. Appl. No. 13/567,288 mailed Oct. 8, 2014, 7 pages.
Advisory Action for U.S. Appl. No. 12/818,986 mailed Oct. 15, 2014, 5 pages.
Examiner's Answer to the Appeal Brief for U.S. Appl. No. 12/953,134 mailed Aug. 1, 2014, 7 pages.
Final Office Action for U.S. Appl. No. 12/394,114 mailed Oct. 31, 2014, 10 pages.
Non-final Office Action for U.S. Appl. No. 12/940,699 mailed Oct. 28, 2014, 9 pages.
Non-final Office Action for U.S. Appl. No. 12/953,039 mailed Nov. 12, 2014, 8 pages.
Notice of Allowance for U.S. Appl. No. 12/952,960 mailed Nov. 10, 2014, 7 pages.
Notice of Allowance for U.S. Appl. No. 13/081,856 mailed Oct. 29, 2014, 10 pages.
Notice of Allowance for U.S. Appl. No. 13/833,876 mailed Nov. 7, 2014, 7 pages.
Advisory Action for U.S. Appl. No. 13/901,074 mailed Nov. 24, 2014, 3 pages.
Notice of Allowance for U.S. Appl. No. 12/751,895 mailed Nov. 19, 2014, 8 pages.
Non-final Office Action for U.S. Appl. No. 12/956,446 mailed Dec. 5, 2014, 12 pages.

* cited by examiner

ATTACHMENT MECHANISMS EMPLOYED TO ATTACH A REAR HOUSING SECTION TO A FIBER OPTIC HOUSING, AND RELATED ASSEMBLIES AND METHODS

PRIORITY APPLICATION

This application claims the benefit of priority under 35 U.S.C. §119 of U.S. Provisional Application Ser. No. 61/483, 918 filed on May 9, 2011, the content of which is relied upon and incorporated herein by reference in its entirety.

BACKGROUND OF THE DISCLOSURE

1. Field of the Disclosure

The present disclosure relates to fiber optic equipment for use in data centers and/or central offices, and more particularly to a rear housing section attached to a fiber optic chassis or housing in data centers and/or central offices.

2. Technical Background

Typical fiber optic telecommunication systems and networks include one or more telecommunications data centers and/or central offices. Large numbers of fiber optic and electrical cable connections that join various types of network equipment may be located in such facilities. The typical system also includes a number of outlying stations that extend the system into a network.

This network equipment is often installed within cabinets in standard-sized equipment racks. Each piece of equipment typically provides one or more adapters where fiber optic or electrical patch cables and or trunk fiber optic cables can be physically connected to the equipment. These patch cables are generally routed to other network equipment located in the same cabinet, while trunk cables are generally routed between cabinets. A common problem in telecommunications systems, and in particular with fiber optic telecommunications equipment, is space management. Current practice in telecommunications is to utilize standard electronics racks or frames that support standard-sized stationary rack-mounted housings with widths of 19 or 23 inches horizontal spacing. Vertical spacing has been divided into rack units "U," where 1U=1.75 inches as specified in EIA (Electronic Industries Alliance) 310-D, IEC (International Electrotechnical Commission) 60297 and DIN ("German Institute for Standardization") 41494 SC48D.

Telecommunications systems are integral to every aspect of an operation of a business. As such, the business may require new and additional programs and applications, particularly as the business grows. This growth can result in more demand on and expansion of the facility, particularly a data center. Therefore, space management in a data center becomes even more critical.

SUMMARY OF THE DETAILED DESCRIPTION

Embodiments disclosed herein include attachment mechanisms configured to be employed to attach a rear housing section to a fiber optic housing, and related assemblies and methods. The rear housing section and the fiber optic housing may be part of fiber optic equipment configured to support fiber optic connections of a fiber optic network. The attachment mechanism is configured to be attached and extend from the rear housing section of the fiber optic housing. The attachment mechanism may include a spring plunger which may releasably maintain the rear housing section in a position to allow fasteners to removably attach the rear housing section to the fiber optic housing. In this manner, the rear housing section may be attached to and removed from the fiber optic housing in an efficient manner to minimize downtime for the fiber optic network.

In one embodiment, a fiber optic equipment assembly is disclosed. The fiber optic equipment assembly may include an extension tray for a fiber optic housing. The fiber optic equipment assembly may also include an attachment mechanism extending from the extension tray. The attachment mechanism may be configured to removably attach the extension tray to the fiber optic housing. The attachment mechanism may comprise at least one spring plunger that releasably maintains the extension tray in a position to allow fasteners to removably attach the extension tray to the housing. In this manner, the extension tray may be removably and efficiently attached to the fiber optic housing.

In another embodiment, a method of adding fiber optic cable strain relief to a fiber optic housing is disclosed. The method may include providing a removable extension tray including an attachment mechanism. The attachment mechanism may comprise a flange with fastener holes and a spring plunger. Next, the method may also include fitting the extension tray to the housing by inserting the flange inside a side wall of the fiber optic housing. Next, the method may include retracting the spring plunger as the flange moves inside of the side wall. Next, the spring plunger may be extended into a spring plunger hole when the flange reaches a position where the spring plunger aligns with the spring plunger hole. In this manner, the attachment mechanism may easily align the extension tray to the fiber optic housing so that the fasteners may be efficiently installed.

In another embodiment, a method of upgrading a first rear housing section attached to a fiber optic housing is disclosed. The method may include providing a first rear housing section attached to fiber optic housing by an attachment mechanism. The attachment mechanism may extend from the first rear housing section. The attachment mechanism may comprise a flange with fastener holes and a spring plunger. Next, the method may include removing the rear housing section from the fiber optic housing by removing fasteners disposed through the side wall holes of a side wall of the fiber optic housing and fastener holes of a flange of the attachment mechanism. Next, the method may include retracting a spring plunger from a spring plunger hole of the fiber optic housing. Next, the method may include removing the flange from inside the side wall of the fiber optic housing. The method may also include attaching a second rear housing section to the fiber optic housing. In this manner, a second rear housing section having greater capacity than the first rear housing may be upgraded efficiently in the field to minimize fiber optic network downtime.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Figure 1:
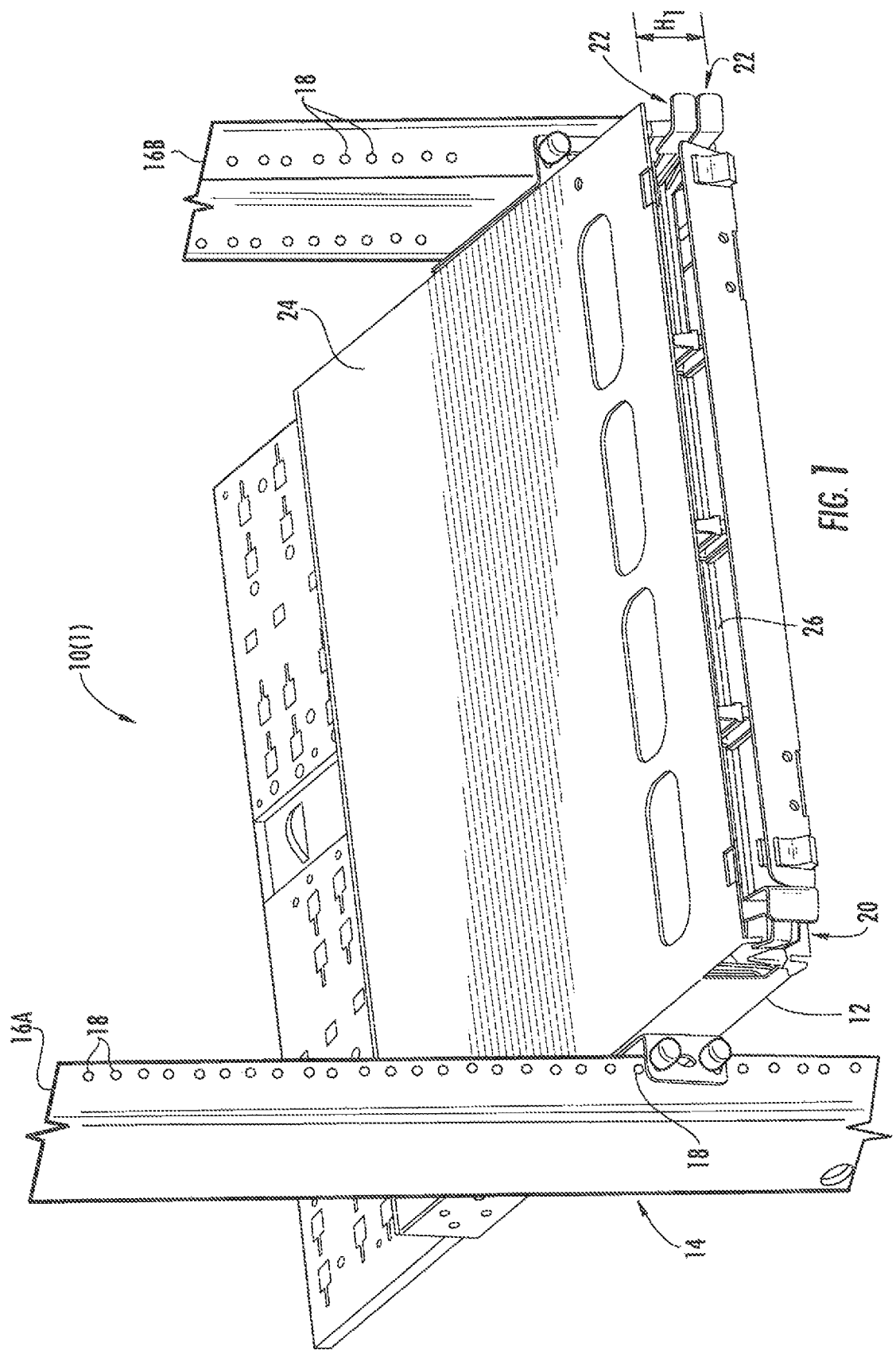
FIG. 1 is a front perspective view of a first exemplary embodiment of fiber optic equipment including a housing and rear housing section installed on a fiber optic equipment rack, the housing supporting independently moveable fiber optic equipment trays and modules, and the rear housing section comprising an extension tray.

Reference is now made in detail to the present embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to, the embodiments described herein.

Embodiments disclosed herein include an attachment mechanism employed to attach a rear housing section to a fiber optic housing, and related assemblies and methods. The rear housing section and the fiber optic housing may be part of fiber optic equipment to support fiber optic connections of a fiber optic network. The attachment mechanism may extend from the rear housing section. The attachment mechanism may include a spring plunger which may releasably maintain the rear housing section in a position to allow fasteners to removably attach the rear housing section to the housing. In this manner, the rear housing section may be attached and removed from the fiber optic housing in an efficient manner to minimize downtime for the fiber optic network.

In this regard, FIG. 1 illustrates exemplary fiber optic equipment 10(1). The exemplary fiber optic equipment 10(1) may be provided at a data distribution center or central office to support cable-to-cable fiber optic connections and to manage a plurality of fiber optic cable connections. The fiber optic equipment 10(1) includes a fiber optic housing 12 ("chassis" or "housing 12"). The housing 12 is shown as being installed in a fiber optic equipment rack 14. The fiber optic equipment rack 14 contains two vertical rails 16A, 16B that extend vertically and include a series of apertures 18. The apertures 18 facilitate attachment of the fiber optic equipment 10(1) inside the fiber optic equipment rack 14. The fiber optic equipment 10(1) is attached and supported by the fiber optic equipment rack 14 in the form of shelves that are stacked on top of each other within the vertical rails 16A, 16B. As illustrated, the fiber optic equipment 10(1) is attached to the vertical rails 16A, 16B. The fiber optic equipment rack 14 may support 1U-sized shelves, any other U-size, with "U" equaling a standard 1.75 inches in height, or any other height desired.

As illustrated in FIG. 1 and discussed in greater detail below in this description, the fiber optic housing 12 includes a fiber optic equipment drawer 20 in this embodiment supporting one or more extendable fiber optic equipment trays 22. Providing the drawer 20 is not required. The fiber optic equipment trays 22 can be moved and extended from the fiber optic equipment drawer 20 and retracted back into the fiber optic equipment drawer 20. Any number of fiber optic equipment trays 22 can be provided. Each fiber optic equipment tray 22 supports one or more fiber optic modules 26 that each support one or more fiber optic connections. The view of the fiber optic modules in FIG. 1 is obstructed by a front chassis cover 24 placed in front of the fiber optic equipment drawer 20 as part of the fiber optic housing 12. The front chassis cover 24 may be attached to a rear chassis cover (not shown) to form a cover over the fiber optic housing 12. The fiber optic equipment drawer 20 is extendable out from the fiber optic housing 12 to access the fiber optic equipment trays 22 and the fiber optic modules 26 supported therein.

In the example of the fiber optic equipment 10(1) in FIG. 1, two fiber optic equipment trays 22 are supported by the fiber optic equipment drawer 20 with each fiber optic equipment tray 22 supporting four (4) fiber optic modules 26. Each fiber optic module 26 supports twelve (12) fiber optic connections. Thus, a total of up to ninety-six (96) fiber optic connections can be provided by the fiber optic equipment drawer 20, although the fiber optic equipment drawer 20 is not limited to this density.

As the drawer 20 is not limited to ninety-six (96) fiber optic connections, more fiber optic connections could be added over time as a demand for additional fiber optic capacity increases. A prerequisite for adding additional fiber optic connections is to provide adequate strain relief for the additional fiber optic cables that may enter and exit the fiber optic housing 12(1). Otherwise, without adequate strain relief, optical fiber damage and/or signal attenuation could occur. Additional strain relief may be added to the fiber optic housing 12(1) with an attachment of a rear housing section 28(1). Other examples of the rear housing sections 28(1) are also available to customize the fiber optic housing 12(1) for the specific fiber optic network requirements.

In this regard, FIG. 2A illustrates a perspective view of the rear housing section 28(1) detached from the chassis or housing 12(1). The rear housing section 28(1) may be an extension tray 30, as a non-limiting example. It should be understood that reference herein to "housing" shall mean, without limitation, chassis, enclosure and/or any type of structure that houses or encloses components, particularly optical components, optical fibers, cables and the like. The rear housing section 28(1) may be connected to the housing 12 with at least one attachment mechanism 34(1), 34(2), as described in more detail below.

FIG. 2B illustrates a detail, perspective view of the attachment mechanism 34(1) extending from the extension tray 30 used to removably attach the extension tray 30 to the housing 12(1). In FIGS. 2A and 2B, the housing 12(1) is shown as a 1U-sized housing 12(1) as measured by height $H_1$. However, it should be understood that the extension tray 30 may be used with and removably attach to any U-sized housing 12(1). Examples of non-1U-sized housing, for example 2U-sized housing 12(2)-12(5), are shown later in FIGS. 4A through 4D.

The extension tray 30 has a substantially flat, rectangular plate 36 comprising two major sides 38(1), 38(2) and two minor sides 40(1), 40(2). The attachment mechanisms 34(1), 34(2) in this embodiment attach to and extend from two opposite corners 42(1), 42(2), respectively, of one of the major sides 38(1), 38(2) of the plate 36. Trunk plates 46(1), 46(2) of the extension tray 30 may include strain relief receivers 48(1), 48(2) respectively. The trunk plates 46(1), 46(2) may be positioned on the plate 36. The plate 36 may also include strain relief receivers 48(3). The strain relief receivers 48(1)-48(3) may be configured to receive fasteners, such as tie wraps, cable clamps and the like, which may be used to attach fiber optic cables, for example trunk cables (not shown), to at least one of the trunk plates 46(1), 46(2) and to provide strain relief for the fiber optic cables.

With continuing reference to FIG. 2B, the attachment mechanism 34(1) on the corner 42(1) is shown in detail. The attachment mechanism 34(1) provides the ability for the rear housing section 28(1) to be easily configured in the field with a single technician. There is no need for a second technician to assist with the rear housing section 28(1) attachment because the single technician may easily align the rear housing section 28(1) to the fiber optic housing 12(1) with the attachment mechanism 34(1), 34(2). The attachment mechanism 34(1) includes a flange 50 with fastener holes 52 and spring plunger 54. The extension tray 30 may be fitted to the housing 12(1) by, as a non-limiting example, inserting the flange 50 inside of a side wall 56(1) of the housing 12(1). The spring plunger 54 retracts as the flange 50 moves inside of the side wall 56(1). When the flange 50 reaches a position 57 (see FIG. 3) where the spring plunger 54 aligns with the spring plunger hole 58, the biasing force of the spring on the spring plunger 54 extends the spring plunger 54 into the spring plunger hole 58. At this point, the fastener holes 52 align with side wall holes 60. The spring plunger 54 releasably maintains the extension tray 30 in the position 57 to allow fasteners 62 to be inserted through the side wall holes 60 into the fastener holes 52 to removably attach the extension tray 30 to the housing 12(1). The fasteners 62 may further support the rear housing section 28(1) with respect to the fiber optic housing 12(1) and resist torsional forces that may be caused by, for example, fiber optic cable strain that may pull the rear housing section 28(1) from the fiber optic housing 12(1). The fasteners 62 may be, for example, screws or other suitable fasteners. As a non-limiting example, the fasteners 62 may be #6-32×188 screws.

Figure 3:
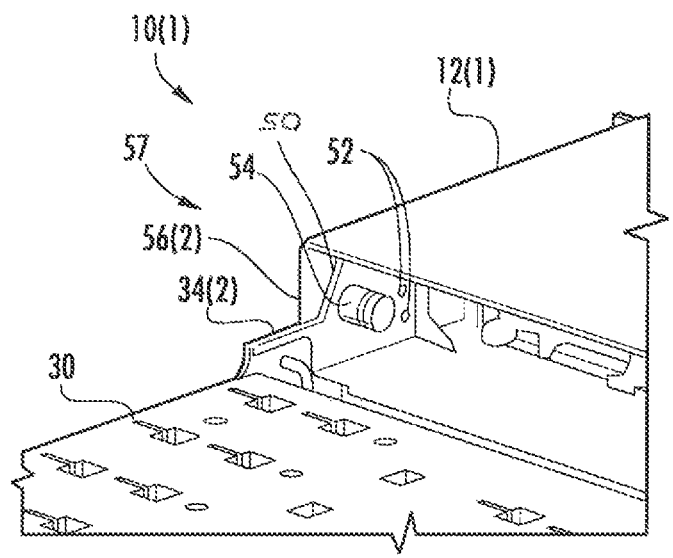
FIG. 3 is a rear, perspective partial view of the extension tray of FIG. 2A attached to the fiber optic housing.

The attachment mechanism 34(2) on the corner 42(2) of the rear housing section 28(1) may have similar components and, accordingly, the discussion with respect to the attachment mechanism 34(1) at the corner 42(1) may apply to the attachment mechanism 34(2) at the corner 42(2). In this regard, as shown in FIG. 3, the attachment mechanism 34(2) at the corner 42(2) may be similarly fastened to the inside of a side wall 56(2) of the housing 12(1) to removably attach the extension tray 30 to the housing 12(1). In this manner, trunk cable strain relief parking positions may be added to or removed from a housing 12(1), including a different housing 12(1) already installed or mounted to or in an equipment rack. In this manner, a user or technician may add parking at the time when additional parking is required without affecting the amount of U-space of the housing 12(1) or requiring the housing 12(1) to occupy any additional U-space or portion of U-space. The U-space may include a height of the fiber optic housing 12(1) and also the width of the housing 12(1). A standard width associated with a U-sized fiber optic housing 12(1) is either 19-inches or 23-inches. In other words, the housing 12(1) maintains the installed U-space the housing occupied prior to the extension tray 30 being removably attached to the housing 12(1). Additionally, the user may remove the additional trunk strain relief parking if the additional parking is not required. The extension tray 30 may be easily mounted to or dismounted from the housing 12(1) as the need requires.

Different sizes of the fiber optic housing 12(1) may be used with the rear housing section 28(1) and may be provided to accommodate different fiber optic housing sizes. For example, one-hundred ninety-two (192) fiber optic connections may be made with a 2U-sized fiber optic housing and thereby provide greater capacity of the fiber optic network compared with the 1U-sized housing 12(1) of FIG. 2A.

Figure 4A:
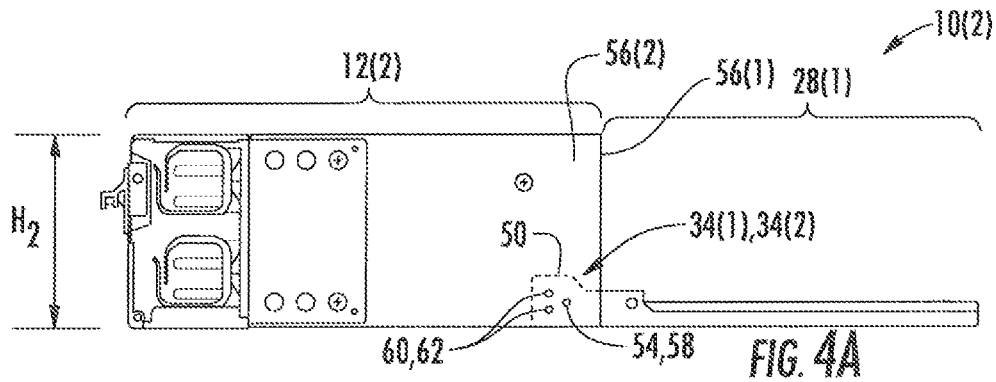
FIG. 4A is a side view of a second embodiment of fiber optic equipment including the rear housing section of FIG. 1 attached to a 2U-sized fiber optic housing.

In this regard, FIG. 4A depicts a side view of a second embodiment of fiber optic equipment 10(2) including the rear housing section 28(1) attached to a second embodiment of a housing 12(2). The rear housing section 28(1) may be the same as the rear housing section 28(1) of the fiber optic equipment 10(1) in FIG. 2A. The housing 12(2) may be 2U-sized as measured by height $H_2$ shown in FIG. 4A. Despite this larger 2U-size of the fiber optic housing 12(1), the rear housing section 28(1) is an "open" design, meaning that a height of the rear housing section 12(1) does not extend to the height $H_2$ of the fiber optic housing 12(2) as will be shown in FIG. 4A. The rear housing section 28(1) may be attached to the housing 12(2) using at least one of the attachment mechanisms 34(1), 34(2) depicted in FIGS. 2A and 2B.

The fiber optic equipment 10(2) may include at least one of the attachment mechanisms 34(1), 34(2) as depicted in FIG. 2B which may each include the spring plunger 54 and fasteners 62, as well as aligning one of the spring plunger holes 58 and the side wall holes 60 respectively. The insertion procedure for attaching the rear housing section 28(1) to the housing 12(2) may be the same as the procedure used for the fiber optic equipment 10(1), as shown in FIG. 2B, because the at least one attachment mechanism 34(2) may be the same as the at least one attachment mechanism 34(1). The at least one attachment mechanism 34(1), 34(2) may be disposed between the side walls 56(1), 56(2) of the housing 12(2) to prevent an increase to the width of the housing 12(2) which may prevent a smooth installation or removal of the fiber optic equipment 10(2) onto or from the fiber optic equipment rack 14.

Figure 4B:
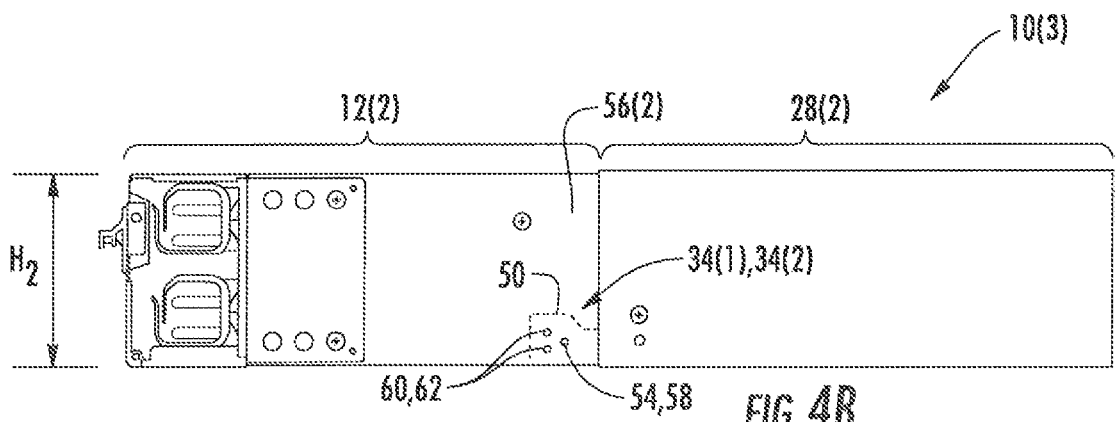
FIG. 4B is a side view of a third embodiment of fiber optic equipment including the fiber optic housing of FIG. 4A attached to a second example of a rear housing section.

FIG. 4B shows a side view of a third embodiment of a fiber optic equipment 10(3) including the housing 12(2) of FIG. 4A attached to a second embodiment of a rear housing section 28(2). The rear housing section 28(2) may be, for example, a 2U-sized deep rear cover measured by the height $H_2$. The rear housing section 28(2) may be attached to the housing 12(2) using at least one of the attachment mechanisms 34(1), 34(2) depicted in FIGS. 2A and 2B.

The fiber optic equipment 10(3) may include at least one of the attachment mechanisms 34(1), 34(2) as depicted in FIG. 2B which may each include the spring plunger 54 and fasteners 62, as well as corresponding one of the spring plunger hole 58 and the side wall holes 60 respectively. The insertion procedure for attaching the rear housing section 28(2) to the housing 12(2) may be the same as the procedure used for the fiber optic equipment 10(1) as shown in FIG. 2B because the at least one attachment mechanism 34(1), 34(2) may be the same. The at least one attachment mechanism 34(1), 34(2) may be disposed between the side walls 56(1), 56(2) of the housing 12(2) to prevent an increase to the width of the housing 12(2) which may prevent a smooth installation or removal of the fiber optic equipment 10(3) onto or from the fiber optic equipment rack 14.

Figure 4C:
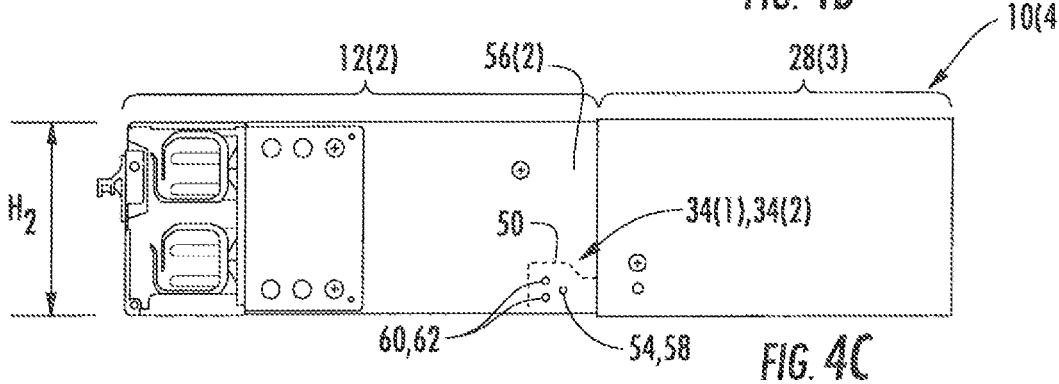
FIG. 4C is a side view of a fourth embodiment of fiber optic equipment including the fiber optic housing of FIG. 4A attached to a third example of a rear housing section.

FIG. 4C shows a side view of a fourth embodiment of a fiber optic equipment 10(4) including the housing 12(2) of FIG. 4A attached to a third embodiment of a rear housing section 28(3). The rear housing section 28(3) may be, for example, a 2U-sized splice rear cover measured by the height $H_2$. The rear housing section 28(3) may be attached to the housing 12(2) using at least one of the attachment mechanisms 34(1), 34(2) depicted in FIGS. 2A and 2B.

The fiber optic equipment 10(4) may include at least one of the attachment mechanisms 34(1), 34(2) as depicted in FIG. 2B which may each include the spring plunger 54 and fasteners 62, as well as corresponding one of the spring plunger hole 58 and the side wall holes 60 respectively. The insertion procedure for attaching the rear housing section 28(3) to the housing 12(2) may be the same as the procedure used for the fiber optic equipment 10(1) as shown in FIG. 2B because the at least one attachment mechanism 34(1), 34(2) may be the same. The at least one attachment mechanism 34(1), 34(2) may be disposed between the side walls 56(1), 56(2) of the housing 12(2) to prevent an increase to the width of the housing 12(2) which may prevent a smooth installation or removal of the fiber optic equipment 10(4) onto or from the fiber optic equipment rack 14.

Figure 4D:
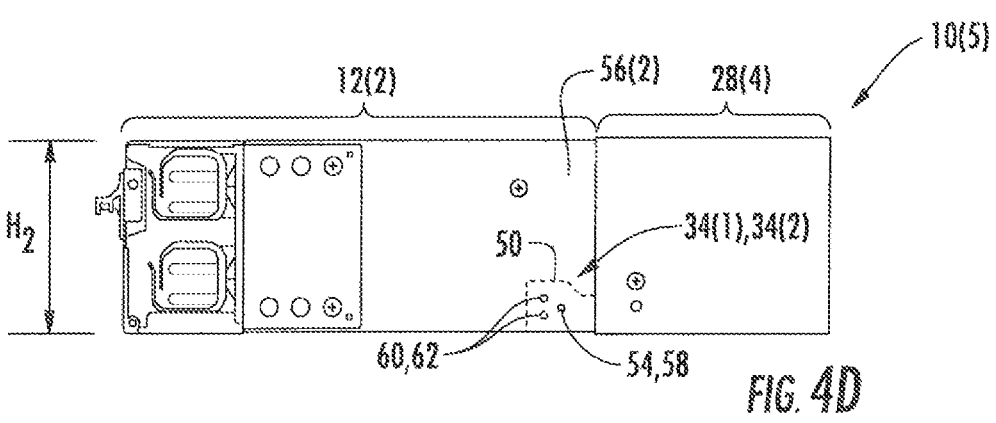
FIG. 4D is a side view of a fifth embodiment of fiber optic equipment including the fiber optic housing of FIG. 4A attached to a fourth example of a rear housing section.

FIG. 4D shows a side view of a fifth embodiment of a fiber optic equipment 10(5) including the housing 12(2) of FIG. 4A attached to a fourth embodiment of a rear housing section 28(4). The rear housing section 28(4) may be, for example, a 2U-sized shallow rear cover measured by the height $H_2$. The rear housing section 28(4) may be attached to the housing 12(2) using at least one of the attachment mechanisms 34(1), 34(2) depicted in FIGS. 2A and 2B.

The fiber optic equipment 10(5) may include at least one of the attachment mechanisms 34(1), 34(2) as depicted in FIG. 2B which may each include the spring plunger 54 and fasteners 62, as well as corresponding one of the spring plunger hole 58 and the side wall holes 60 respectively. The insertion procedure for attaching the rear housing section 28(4) to the housing 12(2) may be the same as the procedure used for the fiber optic equipment 10(1) as shown in FIG. 2B because the at least one attachment mechanism 34(1), 34(2) may be the same. The at least one attachment mechanism 34(1), 34(2) may be disposed between the side walls 56(1), 56(2) of the housing 12(2) to prevent an increase to the width of the housing 12(2) which may prevent a smooth installation or removal of the fiber optic equipment 10(5) onto or from the fiber optic equipment rack 14.

Figures 5, 6:
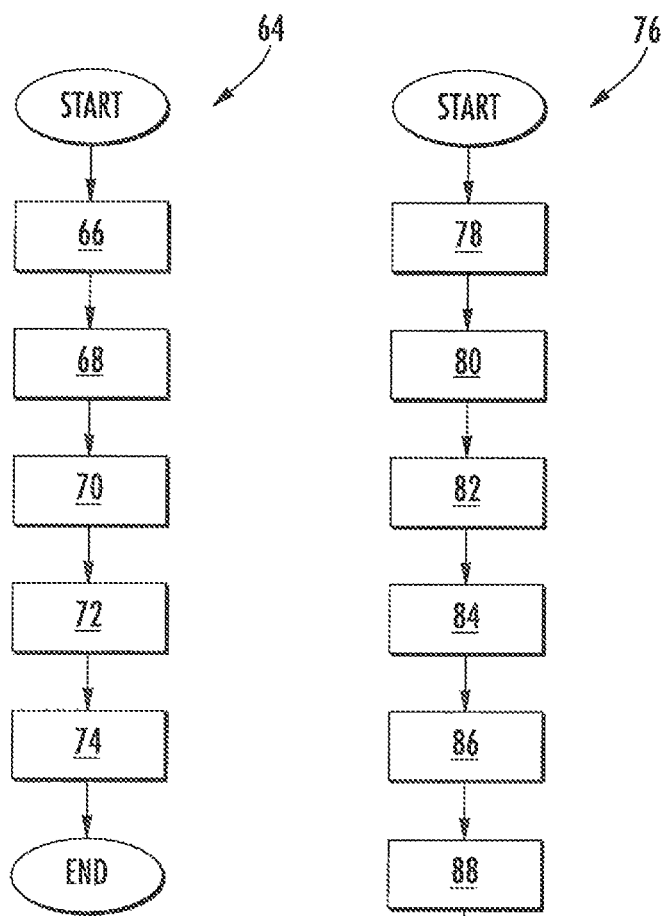
FIG. 5 is an exemplary process of adding fiber optic cable strain relief to the fiber optic housing of FIG. 2A.
FIG. 6 is an exemplary process of upgrading the fiber optic equipment of FIG. 4A to the fiber optic equipment of FIG. 4B.

FIG. 5 is an exemplary process 64 of adding fiber optic cable strain relief receivers 48(1)-48(3) to the fiber optic housing 12(1) is disclosed in reference to the information discussed above and in reference to FIGS. 2A through 3. The process 64 in FIG. 5 will be described using the terminology and information provided above. The first step of the process 64 may comprise providing the removable rear housing section 28(1) including the at least one attachment mechanism 34(1), 34(2) (step 66 in FIG. 5). Each of the attachment mechanism 34(1), 34(2) may comprise the flange 50 with fastener holes 52 and the spring plunger 54.

Next, the process 64 may comprise fitting the rear housing section 28(1) to the fiber optic housing 12(1) by inserting the flange 50 inside the side wall 56(1), 56(2) of the fiber optic housing 12(1) (step 68 in FIG. 5). The flange 50 is inserted in an interior of the fiber optic housing 12(1) when it is inserted inside the side wall 56(1), 56(2). Next, the process 64 may comprise retracting the spring plunger 54 as the flange 50 moves inside of the side wall 56(1), 56(2) (step 70 in FIG. 5). The process 64 may also comprise extending the spring plunger 54 into the spring plunger hole 58 when the flange 50 reaches the position 57 (see FIG. 3) where the spring plunger 54 aligns with the spring plunger hole 58 (step 72 in FIG. 5). The biasing force of the spring 55 on the spring plunger 54 extends the spring plunger 54 into the spring plunger hole 58.

Next, the process 64 may further include removably attaching the rear housing section 28(1) to the fiber optic housing 12(1) by inserting the fasteners 62 through the side wall holes 60 of at least one of the side wall 56(1), 56(2) of the fiber optic housing 12(1) and into the fastener holes 52 of the attachment mechanism 34(1), 34(2) (step 74 in FIG. 5). It is noted that the removably attaching the rear housing section 28(1) may further comprise aligning the fastener holes 52 with the side wall holes 60 while the spring plunger 54 releasably maintains the rear housing section 28(1) in the position 57 (see FIG. 3) to thereby allow the fasteners 62 to be inserted through the side wall holes 60 and into the fastener holes 52.

Figure 2:
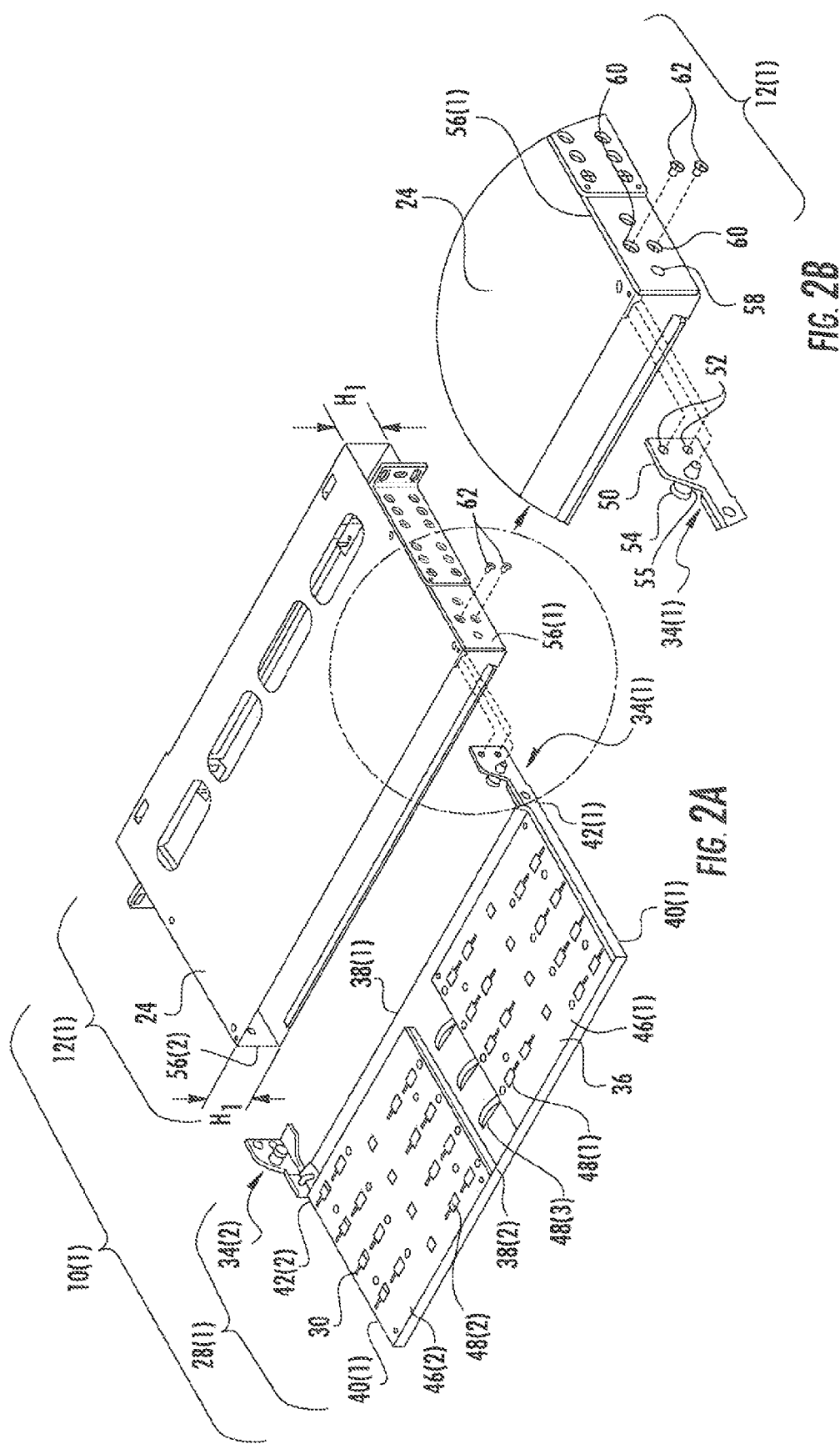
FIG. 2A is a rear, perspective view of the extension tray of FIG. 1 adjacent and unattached to the housing of FIG. 1 according to one embodiment.
FIG. 2B is a perspective, detail view of an attachment mechanism of the extension tray of FIG. 2A.

FIG. 6 is an exemplary second process 76 of upgrading the first rear housing section 28(1) attached to the fiber optic housing 12(1) also disclosed in reference to the information discussed above and in reference to FIGS. 4A and 4B with reference to the detailed components in FIGS. 2A through 3. The process in FIG. 6 will be described using the terminology and information provided above. The first step of the second process 76 may include providing the first rear housing section 28(1) (See FIG. 4A) (step 78 in FIG. 6) attached to the fiber optic housing 12(2) by the at least one attachment mechanism 34(1), 34(2). The at least one attachment mechanism 34(1), 34(2) may extend from the first rear housing section 28(1). The attachment mechanism 34(1), 34(2) may include the flange 50 with fastener holes 52 and the spring plunger 54.

Next, the second process 76 may include removing the first rear housing section 28(1) from the fiber optic housing 12(2) (step 80 in FIG. 6). The first rear housing section 28(1) may be removed by removing the fasteners 62 disposed through the side wall holes 60 of the side wall 56(1), 56(2) of the fiber optic housing 12(2) and the fastener holes 52 of the flange 50 of the attachment mechanism 34(1), 34(2).

Next, the second process 76 may comprise retracting the spring plunger 54 from the spring plunger hole 58 of the fiber optic housing 12(2) (step 82 in FIG. 6). The second process 76 may also include removing the flange 50 from inside the side wall 56(1), 56(2) of the fiber optic housing 12(1) (step 84 in FIG. 6). Then, the second process 76 may include attaching the second rear housing section 28(2) to the fiber optic housing 12(2). The second rear housing section 28(2) may be an upgrade to the first rear housing section 28(1).

Attaching the second rear housing section 28(2) as part of the second process (step 78 in FIG. 6) may include fitting the second rear housing section 28(2) to the fiber optic housing 12(2) by inserting the second flange 50 of the second attachment mechanism 34(1), 34(2) inside the side wall 56(1), 56(2) of the fiber optic housing 12(2) (step 86 in FIG. 6). The second attachment mechanism 34(1), 34(2) may extend from the second rear housing section 28(2). Next, the second process 76 may include retracting the second spring plunger 54 of the second rear housing section 28(2) as the second flange 50 moves inside of the side wall 56(1), 56(2) (step 88 in FIG. 6).

Next, the second process 76 may include extending the second spring plunger 54 into the spring plunger hole 58 of the fiber optic housing 12(2) when the second flange 50 reaches the position 57 where the second spring plunger 54 aligns with the spring plunger hole 58 (step 90 in FIG. 6). The biasing force of the spring 55 on the second spring plunger 54 may extend the second spring plunger 54 into the spring plunger hole 58.

The second process 76 may also include removably attaching the second rear housing section 28(2) to the fiber optic housing 12(2) by inserting the fasteners 62 through the side wall holes 60 and into the fastener holes 52 of the second attachment mechanism 34(1), 34(2) (step 92 in FIG. 6). The fasteners 62 may be inserted with ease when the second spring plunger 54 releasably maintains the second rear housing section 28(2) in the position 57. In this position 57, the fastener holes 52 may be aligned with the side wall holes 60 thereby allowing the fasteners 62 to be inserted with ease.

As used herein, it is intended that terms "fiber optic cables" and/or "optical fibers" include all types of single mode and multi-mode light waveguides, including one or more optical fibers that may be up-coated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments not set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic equipment assembly, comprising:
a rear housing section for a fiber optic housing; and
an attachment mechanism extending from the rear housing section, the attachment mechanism configured to removably attach the rear housing section to the fiber optic housing, wherein the attachment mechanism comprises at least one spring plunger configured to releasably maintain the rear housing section in a position to allow fasteners to removably attach the rear housing section to the fiber optic housing, and wherein the housing maintains an installed U-space the housing occupied prior to the rear housing section being removably attached to the housing.

2. The fiber optic equipment assembly of claim 1, wherein the attachment mechanism comprises a flange, and the spring plunger extends through the flange.

3. The fiber optic equipment assembly of claim 2, wherein the flange comprises fastener holes for receiving the fasteners.

4. The fiber optic equipment assembly of claim 1, wherein the attachment mechanism is inserted inside a side wall of the housing.

5. The fiber optic equipment assembly of claim 1, wherein the rear housing section comprises a substantially flat, rectangular plate.

6. The fiber optic equipment assembly of claim 5, wherein the plate comprises two major sides and two minor sides.

7. The fiber optic equipment assembly of claim 6, wherein the attachment mechanism attaches to and extends from opposite corners of one of the major sides.

8. The fiber optic equipment assembly of claim 5, further comprising at least one trunk plate including strain relief receivers positioned on the substantially flat, rectangular plate.

9. The fiber optic equipment assembly of claim 8, wherein the strain relief receivers are configured to receive fasteners, the fasteners being one or more of tie wraps and cable clamps, and the fasteners are used to attach fiber optic cables to the trunk plate.

10. The fiber optic equipment assembly of claim 1, wherein the rear housing section is an extension tray.

11. The fiber optic equipment assembly of claim 1, wherein the rear housing section is a 2U-sized rear cover.

12. A method of adding a housing section to a fiber optic housing, comprising:
providing a removable rear housing section including an attachment mechanism, the attachment mechanism comprising a flange with fastener holes and a spring plunger;
fitting the rear housing section to the fiber optic housing by inserting the flange inside a side wall of the fiber optic housing;
retracting the spring plunger as the flange moves inside of the side wall; and
extending the spring plunger into a spring plunger hole when the flange reaches a position where the spring plunger aligns with the spring plunger hole, wherein the housing maintains an installed U-space the housing occupied prior to the rear housing section being fitted to the housing.

13. The method of claim 12, wherein a biasing force of a spring on the spring plunger extends the spring plunger into the spring plunger hole.

14. The method of claim 12, further comprising removably attaching the rear housing section to the fiber optic housing by inserting fasteners through side wall holes of the side wall of the fiber optic housing and into the fastener holes of the attachment mechanism.

15. The method of claim 14, wherein the removably attaching the rear housing section further comprises aligning the fastener holes with the side wall holes while the spring plunger releasably maintains the rear housing section in a position allowing fasteners to be inserted through the side wall holes and into the fastener holes.

16. A method of upgrading a first rear housing section attached to a fiber optic housing, comprising:
providing a first rear housing section attached to fiber optic housing by an attachment mechanism extending from the first rear housing section, the attachment mechanism comprising a flange with fastener holes and a spring plunger;

removing the first rear housing section from the fiber optic housing by removing fasteners disposed through side wall holes of a side wall of the fiber optic housing and fastener holes of a flange of the attachment mechanism;

retracting the spring plunger from a spring plunger hole of the fiber optic housing;

removing the flange of the first rear housing section from inside the side wall of the fiber optic housing; and attaching a second rear housing section to the fiber optic housing.

17. The method of claim 16, wherein the attaching the second rear housing section comprises:
fitting the second rear housing section to the fiber optic housing by inserting a second flange of a second attachment mechanism inside the side wall of the fiber optic housing, the second attachment mechanism extends from the second rear housing section;
retracting a second spring plunger of the second rear housing section as the second flange moves inside of the side wall; and
extending the second spring plunger into the spring plunger hole when the second flange reaches a position where the second spring plunger aligns with the spring plunger hole.

18. The method of claim 17, wherein a biasing force of a spring on the second spring plunger extends the second spring plunger into the spring plunger hole.

19. The method of claim 17, further comprising removably attaching the second rear housing section to the fiber optic housing by inserting fasteners through the side wall holes and into fastener holes of the second attachment mechanism.

20. The method of claim 19, wherein the removably attaching the second rear housing section further comprises aligning the fastener holes of the second attachment mechanism with the side wall holes while the second spring plunger releasably maintains the second rear housing section in a position allowing fasteners to be inserted through the side wall holes and into the fastener holes of the second attachment mechanism.

* * * * *